United States Patent [19]

Bellows

[11] Patent Number: 4,901,759

[45] Date of Patent: Feb. 20, 1990

[54] CONSTANT FLOW AND CONSTANT PRESSURE FLUID REGULATOR

[75] Inventor: James C. Bellows, Maitland, Fla.

[73] Assignee: Westinghouse Electric Corp., Pittsburgh, Pa.

[21] Appl. No.: 196,695

[22] Filed: May 20, 1988

[51] Int. Cl.⁴ ............................................. F16K 11/10
[52] U.S. Cl. .................................. 137/505.12; 137/8; 137/885
[58] Field of Search ....................... 137/8, 505.12, 861, 137/883, 885, 563; 73/863.03

[56] References Cited

U.S. PATENT DOCUMENTS

| | | | |
|---|---|---|---|
| 3,083,721 | 4/1903 | Matthews et al. | 137/505.12 |
| 3,543,784 | 12/1970 | Smith | 137/8 X |
| 3,633,416 | 1/1972 | Dyke et al. | 73/199 |
| 3,853,144 | 12/1974 | Whelan | 137/883 |
| 4,402,910 | 4/1983 | Smith et al. | 422/83 |
| 4,472,354 | 9/1984 | Passell et al. | 422/62 |
| 4,799,511 | 1/1989 | Azimov | 137/505.12 X |

*Primary Examiner*—John Fox

[57] ABSTRACT

The present invention provides constant fluid flow and constant pressure to chemical analysis monitors 24–26 for reliably monitoring the quality of fluid in a plant such as a power generating plant. A high pressure fluid source 28 provides fluid to a forward pressure regulating valve 30. The valve 30 supplies a metering valve 36 which regulates flow. The pressure on the output side of the metering valve 36 is maintained constant by a back-pressure regulating valve 40. The constant pressure and flow fluid is supplied from between valves 36 and 40. Excess fluid bled off by valve 40 can be returned to the source 28. A second stage of pressure regulation which improves pressure constancy can be provided by valves 45 and 46 at the first stage pressure or at a different pressure.

9 Claims, 1 Drawing Sheet

CONSTANT FLOW AND CONSTANT PRESSURE FLUID REGULATOR

The present invention relates to a method and apparatus for maintaining a constant fluid flow and fluid pressure and, more particularly, to a system which provides a constant fluid flow and pressure to chemical monitors while eliminating the waste or loss of sample fluid produced by the pressure and flow control system.

DESCRIPTION OF THE RELATED ART

Sampling systems for high purity water must be carefully designed so that representative samples are obtained and analyzed. Sampling systems typically include fluid monitors or analyzers which require a constant flow rate and pressure so that sample accuracy can be maintained. Examples of sampling systems which require constant flow rate can be found in U.S. Pat. No. 4,472,354 and Westinghouse Patent application entitled Chemistry Monitor System having Westinghouse Docket No. 53,896 by the inventor of this application. If the flow in such systems is not constant, particulate deposits in the sample line may be agitated and be brought to the end of the sample line in a non-representative burst. Agitation of the deposits may also alter the concentration of soluble impurities because the common particulate deposits are known to have ion exchange properties. A second concern for a sampling system is to have constant output pressure to the monitors. Monitors are also subject to transient response changes due to changes in flow rate. Some of the commercially available monitors control flow by adjustment of a needle valve and this method is unable to compensate for changes in inlet pressure.

Prior art systems adapt to these problems in two ways. The first is to try to maintain constant flow through the monitors and to tolerate flow changes changes when a monitor is removed from service. This is accomplished by the needle valve of the monitors 20 and results in the need to allow a long settling time for the system while any disturbed fluid passes through the monitors. Monitored values are questionable during this period. The second method is to provide a constant head system as illustrated in FIG. 1. The fluid from a source 10 travels through a piping system 12 which includes a head line 14 having an opening 16 to the atmosphere at a specific height 18 above the sample line inlet to a monitor 20. Excess sample fluid flows out of the opening 16 and is disposed of through drain 22, so this system is limited in the pressure that can be applied. To develop a pressure of 15 lbs. per square inch requires a line 14 approximately 30 feet tall. This system allows constant pressure at relatively constant flow but wastes sample fluid. The fluid exiting through outlet 16 is exposed to the atmosphere contaminating the fluid and preventing recirculation of the fluid back to the source 10. High purity water is very expensive and such a system wastes this expensive fluid.

When a multiplex piping scheme is used to constantly connect and disconnect monitors to various sources, such as is described in the related application mentioned above, the problems of maintaining the constant flow and constant pressure are exacerbated, particularly because the multiplex switching arrangement can switch at rates comparable to the settling time of some of the monitors in the system. If switching does occur at or near the settling time, consistent samples cannot be obtained.

SUMMARY OF THE INVENTION

It is an object of the present invention to provide a fluid flow regulation system which maintains constant flow and constant pressure even in an environment where the connections in the system are constantly changing.

It is also an object of the present invention to produce a system that does not require exposure of the sampling fluid to the atmosphere.

It is an additional object of the present invention to improve the consistency of sampling in a multiplexed sampling system.

It is another object of the present invention to eliminate fluid loss by the constant flow, constant pressure system.

The above objects can be attained by a system in which the sample source is connected to a pressure regulating valve followed by a metering valve. With the system providing fluid to the monitors from between the metering valve and the back-pressure regulating valve, constant fluid flow and pressure can be provided to the monitors. Fluid passed out of the system by the back-pressure regulating valve is returned to the source by a recirculating drain. A second stage of pressure regulation at the first stage pressure or at a second stage pressure can be provided to increase pressure stability.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
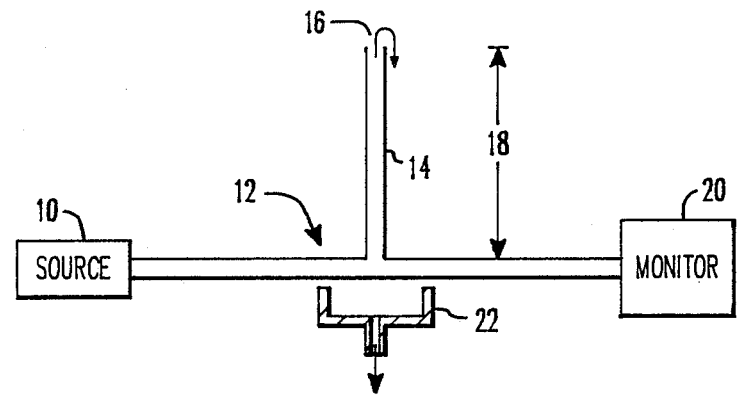
FIG. 1 illustrates the prior art method for limited regulation of pressure which exposes fluid to the atmosphere.
Figure 2:
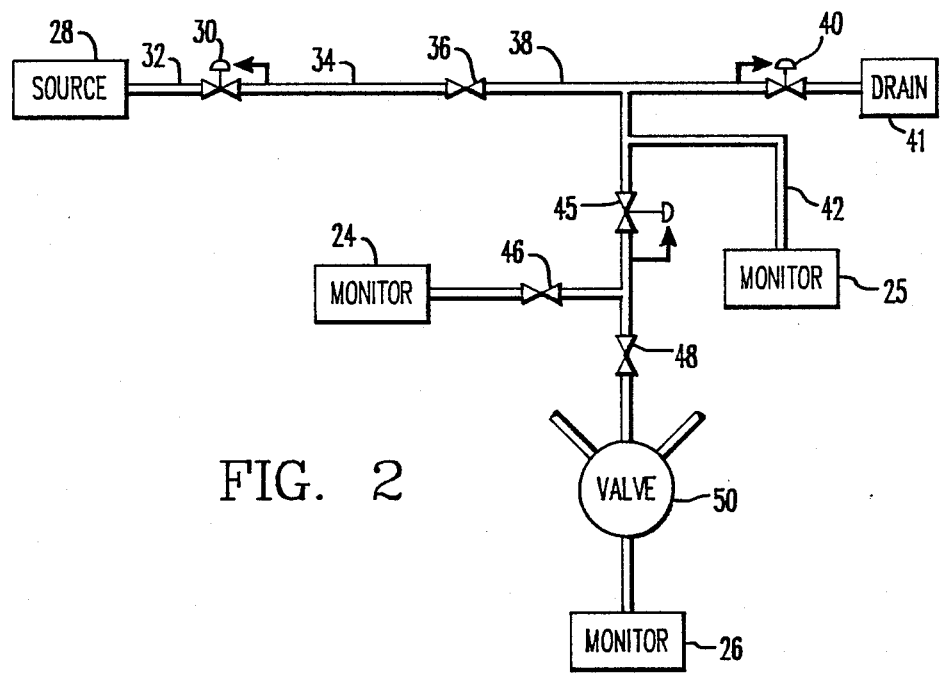
FIG. 2 illustrates the present invention which provides constant pressure and constant fluid flow to monitors 24–26 from a source 28.

A system which will provide constant pressure and constant flow to monitors 24–26 from a source without fluid loss or contamination is illustrated in FIG. 2. The inlet pressure from source 28, when the source 28 is fluid pipes in a steam driven electrical generating system, is 200 lbs per square inch or more. The source 28 is connected to a pressure regulating valve 30 by a pipe 32. The pressure regulating valve 30 is available from Tescom as model model 44-3462524 and maintains a pressure in pipe 34 of, for example, 50 lbs. per square. The constant pressure fluid in pipe 34 is supplied to a metering valve 36 such as in Series M or L available from Newpro or the 2300 series available Hooke. Between the pressure regulating valve 30 and the metering valve 36 a pressure of approximately 50 lbs. per square inch is produced. The output of the metering valve 36 is to pipe 38 which is connected to a back-pressure regulating valve 40 which empties into recirculating drain 41. The recirculating drain 41 returns excess fluid back to the source 28. The back-pressure regulating valve 40 is available as model 26-3225-44 from Tescom. The back-pressure regulating valve 40 is set to maintain a constant pressure of, for example, 30 lbs. per square inch in pipe 38. When the metering valve 36 is set at a specific opening, the valving arrangement will draw a constant flow of fluid from the inlet pipe 34. The magnitude of the flow is dependent on the opening of the metering valve 36 and at a given opening the valve will produce a pressure drop related to the flow through the valve 36. Since the inlet and outlet pressures through metering valve 36 are regulated, the flow through and pressure produced by the valve 36 is determined and regulated. The sample of fluid for the monitors can be withdrawn from pipe 38 between metering valve 36 and back-pressure valve 34 as illustrated by the pipe 42 and monitor 25. A second stage of pressure regulation is provided by pressure regulating valve 45 and collection valves 46 and 48. The pressure regulation valve 45 is preferably the same type as the valve 30 but has a different pressure setting, while shut off valves 46 and 48 can be obtained from a number of manufacturers. While the second stage of pressure regulation is not always necessary and hence optional, this second stage of pressure regulation improves the constancy of the pressure supplied to the monitors 24 and 26 and hence the constancy and accuracy of the flow through monitors 24 and 26. This second stage also allows a different outlet pressure in the second stage while maintaining all the benefits of the first stage. The monitors 24 and 26 are connected downstream of the collection valves 46 and 48 and monitor 26 has an intervening 3-to-1 multiplexing valve 50 which will allow the monitor 26 to sample several different pressure and flow regulated source lines. In a multiplexing monitor system, as described in the U.S. application previously mentioned, several valves 50 are computer operated and the number and specific time at which each multiplex valve 50 is open is not predictable and is generallly considered a pseudo random variable. During operation when a sample is withdrawn by a monitor 24, 25 or 26, the pressure at the back-pressure regulating valve 40 is slightly reduced and this valve 40 compensates for the reduced pressure by closing down and reducing the flow therethrough. During this transition the metering valve 36 maintains a constant flow. The flow to the monitors is rapidly compensated by the reduction in flow through the back-pressure valve 40 while the pressure is brought back to the desired pressure.

The system described above provides the constant sample flow required for good sampling technique and the constant output pressure required for constant monitor flow rates. The system provides this feature without being open to the atmosphere and allowing the sample fluid passing through valve 40 to be collected and pumped back to the source 28. The system will generate any desired input pressure to the monitors by the appropriate selection of the pressures provided by the pressure regulating valves which is particularly important if a monitor is an ion chromatograph which requires high pressures to load concentrator columns, otherwise a pump is required.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What I claim is:

1. A flow and pressure regulator, comprising:
    fluid supply means for supplying a fluid;
    regulation means for transferring the fluid at a constant outlet pressure and constant inlet flow from said fluid supply means without exposure of the fluid to atmosphere; and
    a drain coupled to said regulation means and receiving a variable amount of the fluid as both the constant outlet pressure and constant inlet flow are maintained.

2. A regulator as recited in claim 1, further comprising pressure regulation means, receiving the fluid at the constant pressure and the constant flow, for increasing stability of the constant pressure.

3. A regulator as recited in claim 1, further comprising pressure regulation means, receiving the constant pressure and the constant flow, for maintaining a different constant pressure.

4. A regulator as recited claim 1, wherein said regulation means comprises:
    a pressure regulating valve coupled to said fluid supply means;
    a metering valve coupled to said pressure regulating valve; and
    a back-pressure regulating valve coupled to said metering valve, the constant pressure and constant flow fluid being output between said metering valve and said back-pressure regulating valve.

5. A regulator as recited in claim 4, further comprising pressure regulation means, coupled to said metering valve and said back-pressure regulating valve, for increasing the stability of the constant pressure.

6. A regulator as recited in claim 5, wherein said pressure regulation means comprises:
    a forward pressure regulating valve coupled to said metering valve and said back-pressure regulating valve; and
    a stop valve connected to said forward pressure regulating valve, the increased stability constant pressure fluid being output by said stop valve.

7. A regulator as recited in claim 1, wherein said drain recirculates the fluid back to said fluid supply means shielded from exposure to the atmosphere.

8. A flow and pressure regulator for regulating fluid from a fluid source, said regulator comprising:
    constant pressure means for maintaining a constant output pressure of the fluid without exposure of the fluid to atmosphere;
    constant flow means for maintaining a constant input flow of the fluid from the source; and
    a drain coupled to said constant pressure means and receiving a variable amount of the fluid as both the constant output pressure and constant input flow are maintained.

9. A regulator as recited in claim 8, wherein said drain recirculates the fluid back to the source shielded from exposure to the atmosphere.

* * * * *